June 22, 1965  R. H. WILSON, JR  3,190,581
METHOD AND APPARATUS FOR MAGNETIC STEERING
Filed May 19, 1961  4 Sheets-Sheet 1

INVENTOR
RAYMOND H. WILSON JR.
BY
ATTORNEYS

June 22, 1965  R. H. WILSON, JR  3,190,581
METHOD AND APPARATUS FOR MAGNETIC STEERING
Filed May 19, 1961  4 Sheets-Sheet 2

INVENTOR
RAYMOND H. WILSON JR.

BY
ATTORNEYS

INVENTOR
RAYMOND H. WILSON JR.

June 22, 1965  R. H. WILSON, JR  3,190,581
METHOD AND APPARATUS FOR MAGNETIC STEERING
Filed May 19, 1961  4 Sheets-Sheet 4

INVENTOR
RAYMOND H. WILSON JR.
BY
ATTORNEYS

United States Patent Office 3,190,581
Patented June 22, 1965

3,190,581
METHOD AND APPARATUS FOR
MAGNETIC STEERING
Raymond H. Wilson, Jr., 3937 1st St. SW.,
Washington, D.C.
Filed May 19, 1961, Ser. No. 111,403
18 Claims. (Cl. 244—1)
(Granted under Title 35, U.S. Code (1952), sec. 266)

The invention described herein may be manufactured and used by or for the Government of the United States of America for governmental purposes without the payment of royalties thereon or therefor.

This invention relates to the control of space vehicles and more particularly to a method and apparatus for controlling the angular orientation of a space vehicle by the utilization of magnetic forces.

Recent advances in space technology have resulted in a continuously widening field for the application of artificial earth satellites and deep space probes. As such devices are improved and refined, they are utilized for an increasingly varied range of scientific experiments and are gradually finding application in practical areas of nonexperimental utilization. Recently, artificial earth satellites have been developed, and placed into orbit, which include television cameras for sensing and transmitting to a ground station a pictorial representation of the earth as seen from the satellite.

It will be immediately appreciated that for maximum utilization of a satellite vehicle for purposes of this general nature, some means must be provided for controlling the aspect of the satellite in its orbit. For example, a satellite of the type containing a television camera or similar sensing device must be maintained in a position such that the object to be observed remains within the field of view of the camera. In addition, data received from previously launched satellite vehicles indicates that the satellites have exhibited responses to a plurality of external and, in some cases, undesirable forces which tend to cause a deviation of the satellite from its desired orientation. Therefore, a successful control system must include the capability of maintaining the space vehicle in a desired orientation once the correct position has been attained.

The prior art has seen the development of a number of systems, or proposed systems, which would be utilized for the control of a space vehicle in orbit. However, each of these control methods suffers from inherent limitations or, as a result of the pecular environmental conditions found in outer space, has proved unsatisfactory as an answer to the problem presented. For example, it has been proposed to control a satellite's orientation by means of tangential rockets mounted on the periphery of the vehicle, the operation of which is controlled from the ground. It will be immediately realized that the problem of precisely controlling vehicle angular orientation within limits of a few degrees by such a method will present a nearly insurmountable problem. Another attempt at controlling the orientation of a rotating body has been by the expulsion of "yo-yo" type devices which are designed to vary the rotational speed but have been disadvantage of reducing vehicle mass. Additionally, it has been suggested that gyroscopic or rotating mass devices might be incorporated within a satellite system of this nature to effectuate control of the orbiting object.

Before considering the above problem, it should be realized that basically the "steering" process is only the rotational control of an object and always involves both a directing couple which tends to orient the vehicle in the desired direction and a damping couple by which the rotation may be stopped.

When it is desired to steer an object on the surface of the earth the latter mentioned couple does not present any significant problem inasmuch as there is normally considerable friction between the device being steered and the medium with respect to which the steering is accomplished. However, when a device is rotated in outer space it should be appreciated that the frictional effects are at most minimal. At the lower altitudes, in the neighborhood of a few hundred kilometers or less, appreciable air friction may develop. However, at greater altitudes and more especially in interstellar space the only retarding forces present, of a frictional nature, may result from minute quantities of dust particles and the almost negligible effects from light radiation.

An important constraint of satellite control to be noted in considering the desirable characteristics of a satellite steering system, is that the system must operate with minimal power requirements. Further, it would be highly desirable if the steering operation were effectuated without the loss of vehicle mass. Also, such a steering system should provide a readily controllable method of varying, and then maintaining, the aspect angle of the satellite on command from a ground station.

The instant invention solves the aforedescribed problems by utilizing two separate and distinct forces. One of these forces will tend to cause the vehicle to move in the direction of the desired orientation while the second force will tend to prevent further rotation after this orientation has been achieved. For the reasons mentioned above, the second of these forces is of extreme importance for outer space applications. Previous theories for magnetic control of satellite orientation have not given sufficient importance to this second force required to damp the resultant motion and have therefore proved ineffective because of the negligible natural damping existent in outer space. If, for example, it is desired to rotate a satellite through a given angle to a different orientation, a magnetic force may be applied to cause this rotation from the object's initial position to the new position. However, when magnetic control forces are used, the body will overshoot the desired position by an amount almost equal to the initial angular rotation. Of course a restoring force will then tend to recorrect the satellite to the desired position, only to be followed again by an overshoot. In the approximately frictionless environment of outer space, as was mentioned before, the damping is almost negligible so that the length of time required to stabilize the vehicle at a particular angular orientation will be excessive.

The present invention, therefore, in addition to effectuating rotation of a satellite in the desired direction, also contemplates damping means which, when actuated, will create an effective retarding force, thereby overcoming the objections existent in the prior art.

Accordingly, it is an object of the present invention to provide an improved vehicle control system.

It is another object of the instant invention to provide a space vehicle aspect control system operative on command from a ground station, or a satellite carried programmer, and utilizing the relatively small amounts of power available in a space vehicle from self contained batteries or solar cells.

A further object is to provide an improved space vehicle aspect control system operable without loss of vehicle mass.

Still another object is to provide a method of controlling an object by means of which the aspect of an orbiting object may be selected and maintained within relatively precise limits.

Yet another object is to provide a method for steering vehicles in outer space.

It is also an object of this invention to provide a method for controlling the aspect angle of a body in a frictionless environment.

Yet another object is to provide a space vehicle aspect control system operable by interaction with the spatial magnetic field.

A still further object is to provide an improved space vehicle control system including the feature of positive damping action.

Other objects of this invention will become apparent upon a more comprehensive understanding of the invention for which reference is made to the following specification and drawings which describe illustrative embodiments of the invention and wherein.

Figure 1:
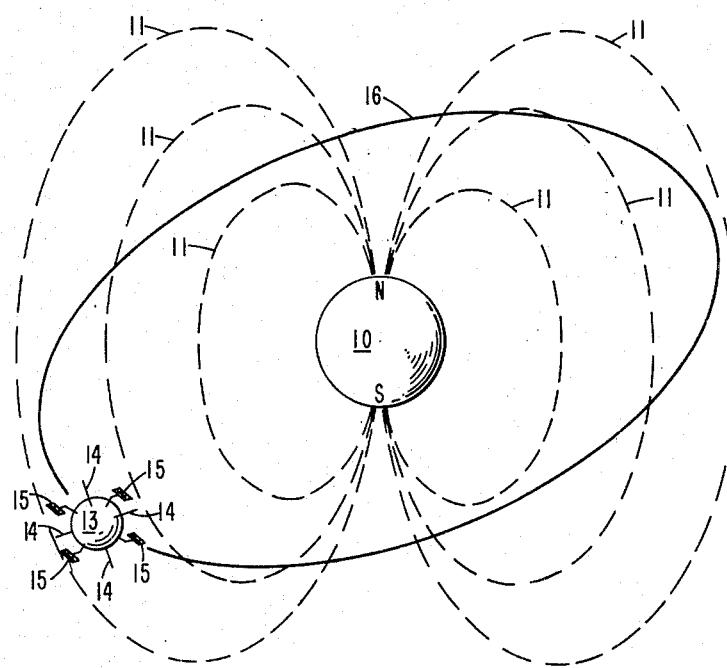
FIG. 1 is a diagrammatic view of the earth and its associated magnetic field with an artificial satellite in orbit thereabout.

Referring now to the drawings wherein like reference numerals refer to like or similar parts in the several figures, and more particularly to FIG. 1, there is illustrated the earth 10 and its associated magnetic field 11. The field 11 is illustrated as representative of the magnetic field vector lines, the H vector, emanating from the north pole of the earth and returning at the south pole thereof. Circumnavigating the space around the earth is illustrated an artificial satellite 13, rotating about the earth in a circular or elliptical orbit 16. It should be understood that an earth orbit is shown only for the purpose of illustration and that the invention is not so limited. The satellite 13 includes radio transmitting antennas 14 and solar cell paddles 15. It should also be realized that while satellite 13 is illustrated for simplicity in an orbit affected only by the magnetic field of the earth, in actual practice the magnetic field existent at any point will be the composite field resulting from the interaction of the earth, sun, planets, and other magnetic bodies found in space.

An enlarged view of satellite 13 is shown in FIG. 2, again following orbit 16 through magnetic field 11. Contained within satelite 13 is a pivotally mounted magnetic device, illustrated here as a simple bar magnet 20, which is mounted for controllable movement within, and relative to, the satellite body, as will be described in greater detail hereinafter.

In practice, the satellite body, if a spherical shell, would be designed of material which would not shield the interaction between the magnet 20 and the reference magnetic field 11. In many instances, however, a satellite may be constructed in such form that the problem of magnetic shielding is not present. As is generally appreciated, the absence of an atmosphere in outer space eliminates any requirement that the vehicle have an aerodynamic shape.

It should be realized from elementary magnetic theory that the bar magnet 20 will, in the same manner as a compass needle, attempt to align itself with the magnetic field vector lines 11. For example, if the magnet 20 is caused by suitable driving means to rotate within the satellite about point 21, forming an angle $\theta$ with field vector lines 11, a restoring or directional couple will tend to rotate the magnet (as with a compass needle) through the angle $\theta$ until the magnet is again aligned with the magnetic field vector. After the initial rotation of the magnet within the satellite is accomplished, the magnet may be fixed relative to the satellite so that further magnet motion will be transmitted thereto. Thus the magnet, and the attached satellite, would rotate through the angle $\theta$ to the position shown by the dotted magnet 22.

However, when a compass needle is displaced from the magnetic field vector and the restoring force is allowed to return it to its original position, there is usually sufficient friction associated with the needle mount so that an appreciable damping force is existent and the needle almost immediately comes to rest in an equilibrium position in line with the H vector.

In the case of a space vehicle in the essentially frictionless environment of outer space, the couple force will rotate the magnet and its attached satellite through the angle $\theta$ from the position shown at 20 to the position shown at 22. This force is equal to MH sin $\theta$; where M is the magnetic moment of the dipole, H is the magnitude of the external field vector and $\theta$ is the angle between the dipole line and the H vector. Then, because of lack of friction and the inertia of the rotating body, it will continue to rotate so that the magnet will be in the position shown at 23. This results in a deviation from the desired position, again almost exactly equal to the angle $\theta$, since in outer space the resistance to such movement is essentially limited to interstellar dust particles and the negligible friction existent from light radiation. When the bar magnet reaches the position shown at 23 a couple force similar but opposite to that existent when it was in position 20 now tends to again restore it to a position in line with the magnetic field vector. However, once more an overshoot will result and it may be seen that the magnet 20 and its attached space vehicle will continue to oscillate about the desired position. As a result of the negligible friction, a period of time of nearby indefinite length will be required before the oscillatory forces are damped out.

Figure 3:
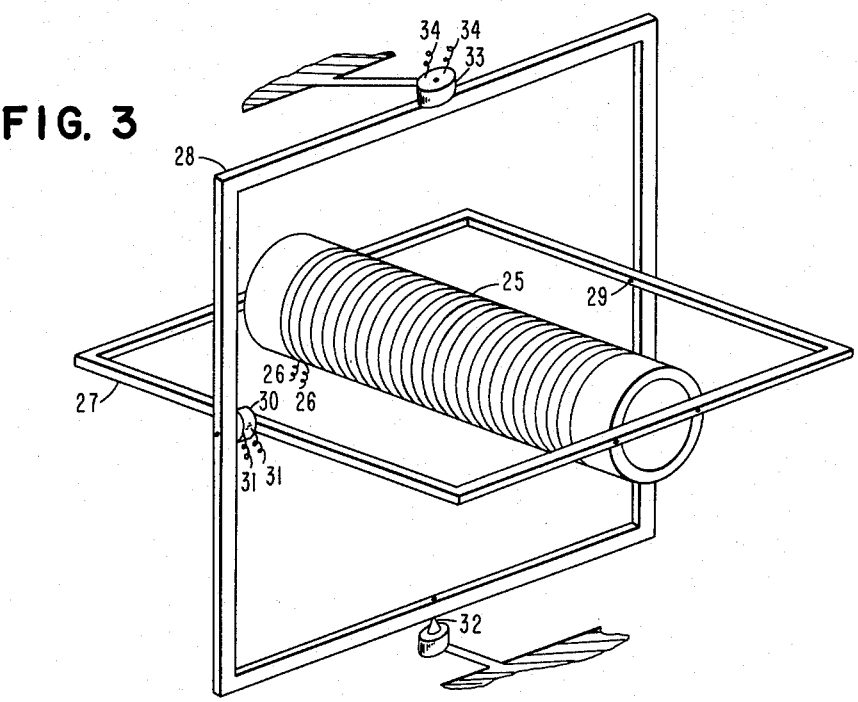
FIG. 3 is a representation of one embodiment of a solenoid or magnet control mechanism for use with the satellite of FIG. 2.

It should be understood that the magnet 20 may be either a permanent type bar magnet or an electromagnetic solenoid. For ease of control, if solar cells are provided to generate a suitable current, it is usually desired that a solenoid be utilized as is illustrated in FIG. 3. In some instances, however, it may be desirable to provide both a permanent magnet and a solenoid in combination. Any suitable means may be used to mount the magnetic device within the satellite for relative positioning in relation thereto.

An example of such mounting means is shown in FIG. 3 where solenoid coil 25, including electrical leads 26, is mounted rigidly within frame 27. Frame 27 is rotatably mounted within a similar, but larger, frame 28 at pivot points 29 and 30. At pivot point 30 an electric motor with control leads 31 is provided to rotate frame 27 and magnet 25 to a desired position about an axis perpendicular to the longitudinal axis of the magnet. In like manner the frame 28 is mounted between pivot points 32 and 33 for rotation about an axis perpendicular to the axis of rotation of frame 27. A motor 33, illustrated as having control leads 34, is included to effectuate rotation of the outer frame 28. Thus, by means of motors 30 and 33 the desired positioning of solenoid 25 may be atttained whereby the position of the longitudinal axis of this solenoid may be located in any direction desired within satellite 13.

It should be realized that motors 30 and 33 may take any convenient form such as D.C. motors, servos, stepping switches or other such devices that will enable the rotation of solenoid 25 to be controlled on a command signal. It may also be desired to design the control devices so that control may be effectuated by means of a digital type of signal, which is most conveniently transmitted from the ground over long distances.

Figure 2:
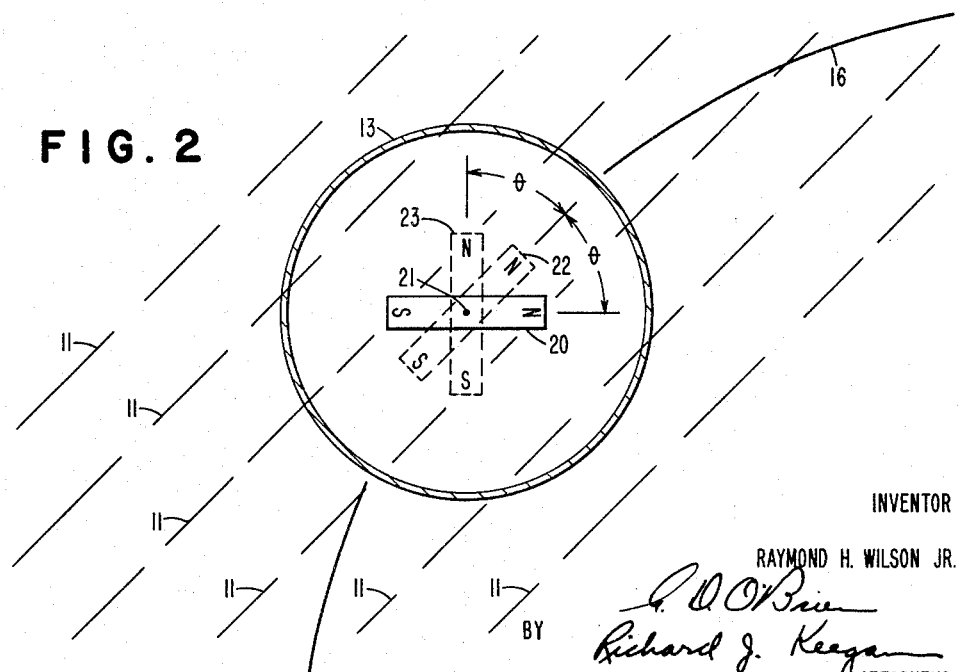
FIG. 2 is an enlarged diagrammatic view of the satellite of FIG. 1 showing a means and method by which aspect angle changes of a satellite are initiated.

As was pointed out previously, the magnet 20 illustrated in FIG. 2 may take the form of a solenoid coil as shown at 25 in FIG. 3. For some applications of the present invention, a combination of a permanent magnet and a solenoid may be desirable. When both are combined in the same mount, the magnet may be utilized to generate a constant couple force which will continuously tend to align the vehicle with the local magnetic field. Such a couple is, of course, generated without any drain on the satellite's power supply. At such time as it is desired to effectuate a major change in vehicle orientation, the relatively stronger electromagnetic solenoid may be properly positioned and energized, using current of the appropriate polarity, so that its magnetic strength will be added to that of the permanent magnet. In this manner a couple of relatively greater strength may be generated for limited periods of time when convenience necessitates while a continuous torque of lesser strength is present at all times and will tend to correct for minor variations in the desired orientation of the body.

From the previous description it will be seen that in addition to the restoring couple provided by solenoid 25, it will be necessary to provide means to exert a second force which will act so as to provide damping of the satellite's rotational motion.

It is contemplated by the present invention that a damping couple will be generated by the interaction of highly permeable extendable rods with the magnetic field existent at the local position of the satellite. When permeable rods are extended from a rotating vehicle in a magnetic field, a torque opposing any rotation will be developed. It has been discovered that when such rods are long in relation to their diameter, the force resulting from the interaction of such rods with a magnetic field is greatly increased.

It is well known that a damping torque is generated on an axially symmetric conductor rotating in a magnetic field. From Lenz's Law the equation may be developed for the elemental magnetic couple of a continuous solid of revolution. When one of the dimensions of its cross section is infinitesimal this equation reduces to the form:

$$\Delta C = \frac{\sigma A^2 \mu^2 H^2 \omega a}{b} \quad (1)$$

where:

$C$ = the mechanical rotational couple;
$\sigma$ = the electrical conductivity;
$A$ = the area projected on a plane of angular reference of an elemental closed conducting loop;
$\mu$ = the effective magnetic permeability;
$H$ = the magnetic field component normal to the axis;
$\omega$ = the angular velocity;
$a$ = the conducting cross sectional area of an elemental loop or ring; and
$b$ = the length of elemental conducting loop.

As was mentioned above, the rods used for damping the movement of a space vehicle should have the shape of a long cylindrical shell so that a maximum retarding torque will be generated. For purposes of calculating the force involved, it will be necessary to consider rotation about an axis perpendicular to the geometrical axis, although still assuming symmetry of mass and a resultant geometrically central location of the transverse axis.

The total force of the couple is found by integrating the couple of an elemental conducting ring throughout the body of the cylindrical shell or rod. Two possible forms of this ring must be considered. The first possible element would be a circular ring always perpendicular to and centered on the geometrical axis of the cylinder, and the second a rectangular ring parallel to the geometrical axis.

In the present specific case there must be used, not the maximum value of each elemental couple, but the mean value, which is half as great. Equation 1, thus modified, would be $$\Delta C = \frac{\sigma A^2 \mu^2 H^2 \omega a}{2b} \quad (2)$$

However, the total $\Delta C$ would be the sum of those for two such perpendicular elemental rings. To verify this principle, consider rotation about the axis of revolution: in this case the corresponding rings are equal, so that the total torque is again the same as Equation 1.

The mean element of the damping couple for the circular elemental rings of a cylinder from Equation 2 is $$\Delta C_1 = \frac{1}{4}\sigma \pi \mu^2 H^2 \omega r^3 \Delta h \Delta r \quad (3)$$

where $r$ is the dimension perpendicular to the geometrical axis, $h$ the dimension along that axis, and $\mu$ the effective mean permeability for a field normal to the axis of the cylinder. The mean element of couple on the rectangular rings would be:

$$\Delta C_2 = \frac{2\sigma \mu_2^2 H^2 \omega h^2 r^3 (h \cos^2 \phi + 2r \cos^4 \phi)}{(h + 2r \cos \phi)^2} \Delta \phi \Delta r \quad (4)$$

where $\phi$ is the third cylindrical coordinate and $\mu_2$ the effective mean permeability with a field parallel to the axis of the cylinder. Integrating Equation 4, letting $k$ be the length to diameter ratio, gives immediately the result for a shell of thickness $\Delta r$:

$$C_2 = \frac{\sigma \mu_2^2 H^2 \omega h^4 k}{2}\left[\frac{\pi}{4}\left(\frac{3}{k}+1+\frac{k}{2}\right)-\left(1+\frac{1}{2-2k}\right)-\frac{3-4k}{K(1-k)\sqrt{1-k^2}} \arctan \frac{\sqrt{1-k^2}}{1+k}\right]\Delta r \quad (5)$$

Integration of Equation 3 for the couple on the circular elements of such a shell should be carried out separately for the ends and for the lateral surface of the cylinder. For the ends, integration is with respect to $r$, keeping $\Delta h$ constant as the thickness of the shell. On the other hand, for the lateral surface integration would be with respect to $h$, with $r$ and $\Delta r$ held constant. Thus:

$$C_1 = \frac{1}{4}\sigma \pi \mu_1^2 H^2 \omega \left(\frac{1}{2}r^4 \Delta h + r^3 h \Delta r\right) \quad (6)$$

Since $\Delta h = \Delta r$ for a shell of uniform thickness such as has been assumed in deriving Equation 5, Equation 6 becomes $$C_1 = \frac{1}{4}\sigma \pi \mu_1^2 H^2 \omega \left(\frac{1}{2}r + h\right) r^3 \Delta r \quad (7)$$

The magnitude of the total damping torque on a cylindrical shell of radius $r$ and height $h$ rotating about a transverse axis, due to a magnetic field $H$ normal to this axis may now be determined by adding the numerical values for $C_1$ and $C_2$ which are obtained from Equations 5 and 7 above.

The present invention contemplates the application of the above principle to a space vehicle wherein a means and method are provided for damping the rotational oscillations of the vehicle that result from the application of the magnetic couple which is used to accomplish rotational movement as described in connection with FIG. 2.

Figure 4:
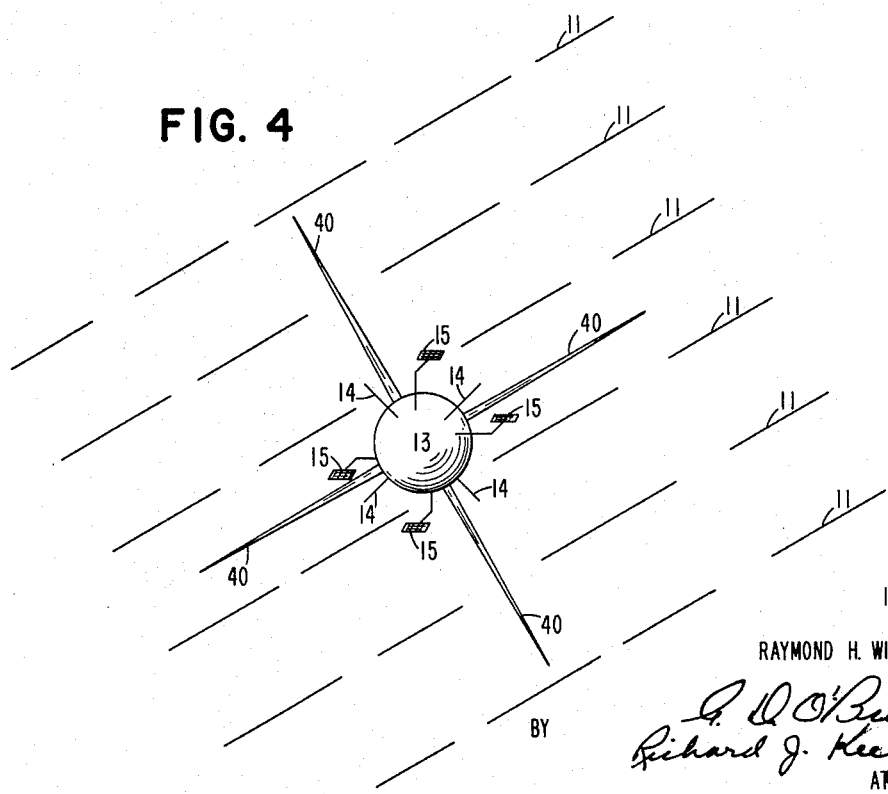
FIG. 4 is an enlarged view of the satellite of FIG. 1 illustrating damping rods in the extended position in a magnetic field.

Referring now to FIG. 4, there is illustrated a satellite vehicle 13 passing through magnetic H vectors 11 which are representative of the magnetic field existent in interstellar space. Satellite 13 includes extendable rods 40 which are comprised of highly permeable magnetic material and which are capable of being retracted into the satellite body or extended at will. It will be observed that, when the satellite is caused to rotate about a central point, the rods 40 will sweep through the magnetic H vectors 11, generating a force opposing the rotational movement. As was demonstrated above, the force generated is proportional to the ratio of the length to the diameter of the rods 40 and therefore may be greatly reduced by retracting the rods into the satellite body in a manner similar to that of a retractable whip antenna. This will result in a much smaller length to diameter ratio with a resultant reduction in the generated torque.

It has been discovered that the effect of the retracted rods may be further reduced by providing a solenoid to magnetically saturate the permeable rods when in their retracted position and during the time that it is desired to cause satellite reorientation.

Inasmuch as the solenoid 25 which is used to generate the restoring torque has a limited field strength because of the requirement that it normally be powered by solar cells, it will usually require an appreciable time interval for angular satellite rotation to take effect. Thus, when it is desired to change the orientation of an orbiting body the rods 40 may be maintained in the retracted position, and preferably in a magnetically saturated state, while a correcting torque is generated by solenoid 25. As the satellite gradually attains a rotating velocity and moves toward the desired orientation, the permeable rods 40 may be extended, by means which will be described hereinafter, just prior to attaining the desired position. This will generate a second torque, the magnitude of which depends on the length to diameter ratio of the rods, opposing the rotational movement of the satellite body, thus bringing it to rest in the desired position.

After the satellite has attained a desired orientation, the extended rods will then aid in maintaining this position, preventing undesired wobbling and random rotation while the satellite is in transit. The vehicle, if in an orbit of low inclination about the earth, will become locked in the earth's magnetic field and will rotate once about its axis with each revolution about the earth. Thus, the earthward orientation of the satellite remains constant; i.e., the same surface of the satellite will be presented to the earth at all times. In the case of weather satellites or similar vehicles which are utilized to photograph or otherwise record the surface of the earth, such a feature is highly desirable.

Figure 5:
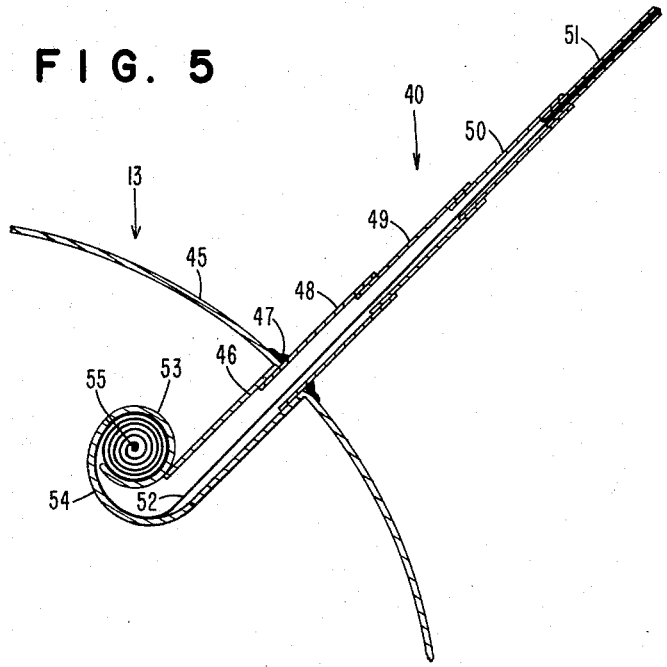
FIG. 5 is an illustration of one embodiment of a retractable damping rod for use with the satellite of FIG. 2.

Referring now to FIG. 5 wherein is described one acceptable means for providing an extendable shaft to effectuate the above described operation, it will be seen that a satellite 13 including skin 45 contains therein a cylindrical section 46 mounted behind an opening 47 in the surface of the satellite. Additional cylindrical sections 48, 49, 50 and 51 are provided, each of which is of decreasing radius and constructed to telescope one within the other. The extendable rod may have any desired length depending on the number of sections provided. It should be realized that the satellite will be functioning in an environment of essentially zero gravity and zero wind resistance. Therefore, the construction of these sections may be relatively fragile. Suitable means are provided to cause the extension and retraction of the telescoping rod sections 48, 49, 50 and 51 which may be, as disclosed, a length of spring steel tape 52. This steel tape is attached to the section of smallest diameter 51 and slides within curved track 54, mounted on the inner extremity of interior section 46. A cylindrical container 53 is provided at the other end of curved track 54 to contain therein the length of spring steel when the telescopic rod is retracted. A shaft 55 positioned within cylinder 53 and driven by a motor (not shown) is attached to the other end of steel tape 52 so that as shaft 55 rotates the tape will be wound in a coil around the shaft and as the winding operation proceeds the telescopic rod will be withdrawn into the satellite shell. A reverse operation will extend the rod to the limit of sections 48, 49, 50 and 51.

Figure 6:
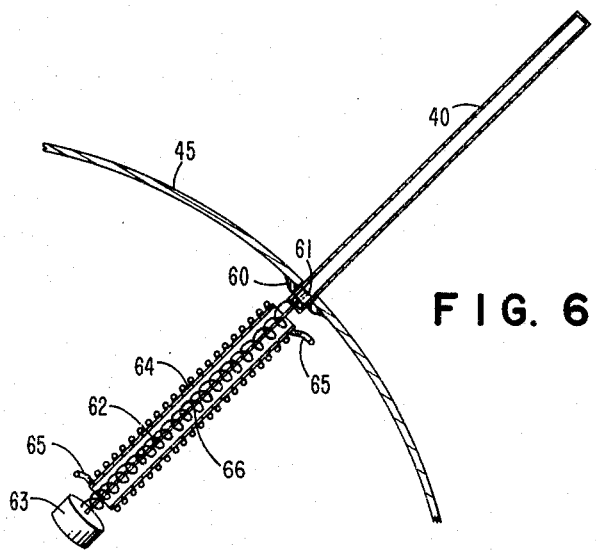
FIG. 6 is an illustration of another embodiment of a retractable damping rod for use on a satellite or other space vehicle.

A second structural embodiment for controlling the extension of the damping rods 40 is illustrated in FIG. 6. For some applications it will be found that damping rods having a length not exceeding the diameter of the satellite will suffice for the intended purpose. In such instances a single section rod of highly permeable material may be constructed so that it is withdrawn into the satellite when not in use. This may be accomplished by constructing the rod in the form of a cylinder which will pass through sleeve 60 positioned at the satellite surface 45 and over piston 61 attached to the extreme end of pressure tube 62. Fluid pump 63 forces fluid, which may be either liquid or gaseous, through tube 62 into the cylinder formed by rod 40, the pressure forcing the damping rod into the extended position. In like manner the withdrawal of fluid from the interior cylinder of rod 40 will permit spring 66 to retract damping rod 40 into the satellite structure.

It should be realized that, although the force will be less effective because the shorter moment arm, the damping rod will continue to oppose rotation to some extent when withdrawn into the satellite. However, the damping effect can be neutralized by surrounding the retracted rod with an energized solenoid of sufficient strength to completely saturate the magnetic material of rod 40. Therefore, coil 64 is provided which surrounds rod 40 in the retracted position, which coil is energized through leads 65 from an internal battery or solar cells, and which effectively saturates the magnetic material of the retracted damping rod, neutralizing its effect when rotation of the controlled body is desired.

Figure 7:
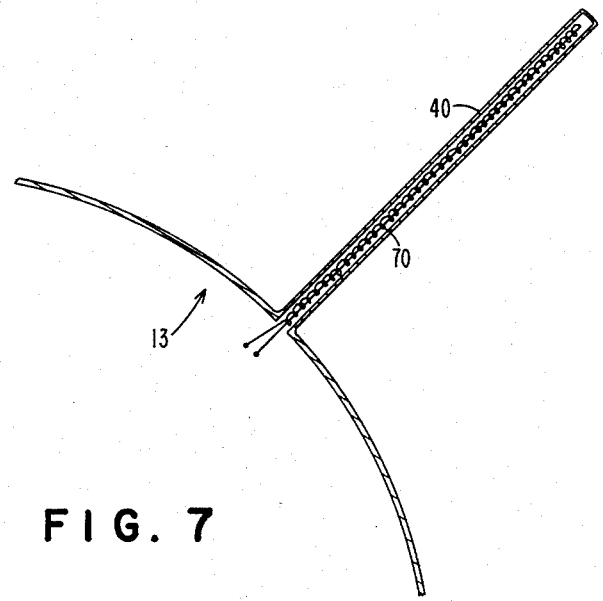
FIG. 7 is an illustration of a damping rod showing one method for neutralizing the braking action with the rods in the extended position.

Alternatively a damping rod 40 can be constructed, as shown in FIG. 7, to remain in the extended position with a magnetic coil 70 permanently positioned therein so that when it is desired to effectuate rotation of satellite 13, a current is caused to flow through this coil, effectively neutralizing the damping action of rod 40.

Figure 8:
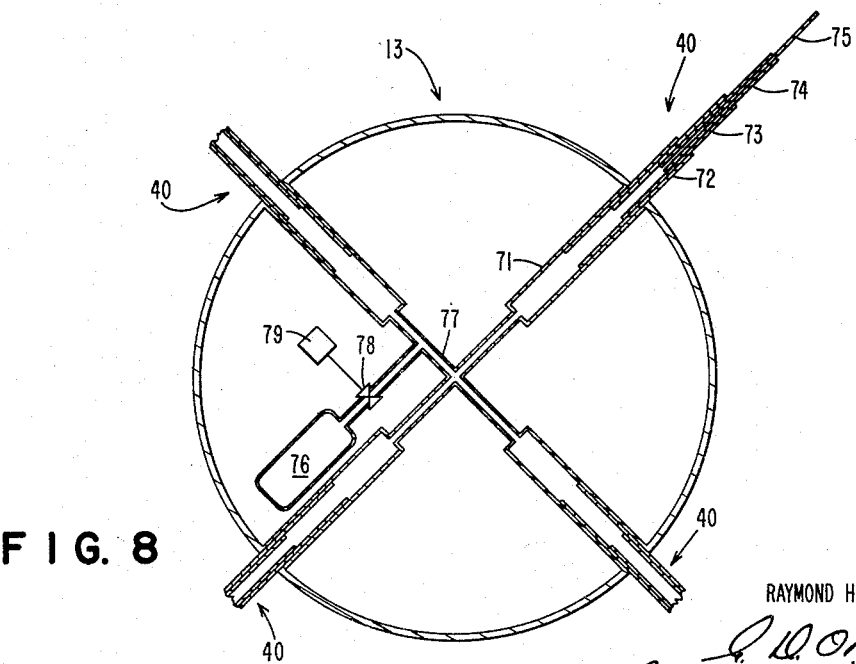
FIG. 8 is an illustration of a damping rod operated by the pressure from a satellite contained air bottle.

Yet another embodiment of the present invention is disclosed in FIG. 8, which embodiment is particularly adaptable to the situation where a satellite is to be injected into an orbit and the desired orientation is to be maintained throughout the life of the vehicle. Certain satellite applications such as some communications or weather satellites require only that a particular orientation be maintained relative to the body about which the vehicle revolves, there being no requirement that the orientation be adjustable after the initial positioning. For such use it is desired that the satellite be locked in the magnetic field of the earth, if an earth satellite. This may be conveniently accomplished by providing a satellite 13 with extendable permeable rods 40, which rods are constructed in a telescopic manner so that after orbit is attained, and the initial orientation accomplished, the rods 40 may be extended so as to lock the satellite 13 into the existing magnetic field. The damping rods 40 may be constructed of a plurality of sections 71, 72, 73, 74 and 75, which are adapted to slideably fit one within the other in a reasonably air tight manner. An air bottle 76 is carried within satellite 13 and connected through tubular connecting lines 77 with the innermost section 71 of the damping rods 40. Immediately adjacent air bottle 76 a cut off valve 78 is provided to contain a suitable pressure within bottle 76 until such time as it is desired to actuate damping rods 40. The cut off valve 78 may be actuated by any suitable means, illustrated symbolically at 79, which may consist of a radio controlled actuation device or a preset signal from an automatic programmer contained within the vehicle. Thus, when the orbit and a desired orientation therein is accomplished, the vehicle may be locked into a fixed position relative to the body about which it orbits by opening valve 78 and allowing pressure fluid contained within bottle 76 to force the slideable damping rods into the extended position.

The instant invention will be most completely understood by considering an entire cycle of operation. Assume that it is desired to vary the aspect angle of an earth satellite which is passing through a magnetic field of known direction and further assume that the aspect angle of the satellite may be measured relative to a fixed coordinate system by any of a number of means well known in the art. Signals are transmitted from the ground to actuate the mechanism for controlling the relative position of solenoid 25 within the satellite body so that it deviates from the direction of the existent magnetic field by an angular amount equal to the desired change in satellite orientation. At this time the solenoid 25 is energized by the power source, which may be solar cells or batteries, contained within the satellite.

A turning couple will thus be created which will rotate the satellite in such a direction that the solenoid 25 will align itself with the existing H vector 11. Because of the usually low strength of solenoid 25, which results from the minimal power available, the rotating motion of the satellite will be relatively slow because of the low torque developed and the comparatively high mass of the satellite. Monitors on the ground will follow the rotating satellite, utilizing signals available from conventional aspect sensors. At such time as the satellite approaches the desired orientation, the damping rods will be actuated, resulting in a strong force opposing any rotational movement. This will then stop the rotation of the satellite, and effectively damp any tendency to oscillate.

It would, of course, be possible to continue to maintain the satellite in the desired position by means of the energized solenoid coil. However, for purposes of conserving power it is desirable that, when a fixed orientation relative to, for example, the earth is desired, the coil be de-energized and the damping rods, maintained in an extended position, be utilized to lock the satellite within the magnetic field of the earth thereby preventing relative rotation of the satellite with respect to the earth.

While the particular system and methods disclosed herein have been described in conjunction with specific embodiments for accomplishing the desired control it should be understood that the invention is not limited to any particular mechanical system but rather comprehends the utilization of any of a number of well known means for positioning a solenoid or other magnetic device within a satellite and for actuating magnetic damping rods for terminating rotational motion caused by the solenoid at a desired position in space.

What is claimed is:

1. The method of controlling the orientation of a body in a magnetic field, comprising, the steps of angularly displacing a magnetic device rotatably attached to said body from the direction of said magnetic field, fixing said device to rotate said body in a direction determined by the angular displacement of said device with respect to said field and actuating permeable metallic protrusions to interact with said field to damp further rotational motion of said body.

2. The method of controlling the orientation of a body in a directional magnetic field, comprising, the steps of angularly displacing from said directional field a permanent magnet pivotally mounted for rotation with respect to said body, fixing said magnet relative to said body to rotate said body in a direction determined by the angular displacement of said device with respect to said directional magnetic field and actuating magnetic braking means to interact with said field to damp further rotational motion of said body.

3. The method of controlling the orientation of a body in a magnetic field having a magnetic intensity vector, comprising, the steps of angularly displacing from said intensity vector an electromagnetic solenoid rotatably attached to said body, fixing said solenoid relative to said body, energizing said solenoid to rotate said body in a direction determined by the angular displacement of said solenoid with respect to said magnetic vector and actuating permeable metallic protrusions to interact with said field whereby any rotational motion of said body will be damped.

4. The method of controlling the orientation of a body in a magnetic field, comprising, the steps of angularly displacing a magnetic device rotatably attached to said body from the direction of said magnetic field, fixing said device relative to said body to rotate said body in a direction determined by the angular displacement of said device with respect to said field and extending from said body permeable metallic rods to interact with said field to damp rotational motion of said body.

5. The method of controlling the orientation of a body in a magnetic field including a magnetic intensity vector, comprising, the steps of angularly displacing a magnetic device rotatably attached to said body from the direction of said magnetic intensity vector, said magnetic device comprising in combination a permanent magnet and an electromagnetic solenoid, fixing said device relative to said body to rotate said body in a direction determined by the angular displacement of said device with respect to said magnetic intensity vector, energizing said electromagnetic solenoid to accelerate the rotation of said body in said direction, actuating permeable metallic rods to interact with said field to damp any oscillatory motion of said body and de-energizing said solenoid after the desired orientation is attained.

6. The method of establishing and maintaining the orientation of an artificial satellite orbiting about a magnetic body, comprising, the steps of angularly displacing a magnetic device within said satellite relative to the direction of said magnetic field, fixing said device relative to said satellite to rotate said satellite in a direction determined by the angular displacement of said device relative to the direction of said magnetic field and actuating magnetic braking means to interact with said field whereby said satellite will be rotated to a desired orientation relative to said magnetic field direction and any oscillatory motion of said satellite will be damped by the interaction of said magnetic braking means with said magnetic field.

7. The method of controlling the orientation of a body in a celestial magnetic field having a magnetic field vector of known direction, comprising, the steps of angularly positioning a magnetic device within said body relative to the direction of said magnetic field, allowing said magnetic device to rotate said body in the direction of alignment with said magnetic field direction and actuating permeable metallic rods to interact with the said field to damp oscillatory rotational motion of said body.

8. A device for controlling the orientation of a rotatable body in a magnetic field, comprising, magnetic means carried by said body, control means attached to said body and said magnetic means for adjusting the position of said magnetic means relative to said body, magnetic damping means attached to said body for generating a rotational damping force when interacting with said magnetic field and means for neutralizing said damping means when rotational motion is desired whereby said body may be caused to rotate to a desired position and then rapidly be brought to an angularly stable condition.

9. A device for controlling the orientation of a rotatable body in a magnetic field, comprising, a gimbal carried by said body, magnetic means mounted on said gimbal, means attached between said gimbal and said body for adjusting the relative position of said magnetic means and said body, permeable metallic rods attached to said body for generating a damping force when interacting with said magnetic field and means for neutralizing the damping action of said rods when rotational motion is desired whereby said body may be caused to rotate to a desired position and then rapidly be brought to an equilibrium condition.

10. A device for controlling the orientation of a rotatable body in a magnetic field having a magnetic intensity vector in a known direction, comprising, electromagnetic solenoid means mounted for relative rotation with respect to said body, means for effectuating rotation of said solenoid relative to said body, permeable metallic rods attached to said body for generating a damping force when interacting with said magnetic field and means for neutralizing the damping action of said rods when rotational motion is desired whereby said body may be caused to rotate to a desired position and then rapidly brought to an equilibrium condition.

11. A device for controlling the orientation of a rotatable body in a magnetic field having a magnetic intensity vector in a known direction, comprising, magnetic means including a permanent magnet and an electromagnetic solenoid, said permanent magnet and said electromagnetic solenoid being mounted in magnetic alignment, said magnetic means being mounted for relative motion with respect to said body, means for effectuating rotation of said magnetic means relative to said body, signal actuated means carried by said body to energize said solenoid, permeable metallic damping means carried by said body for generating a damping force when interacting with said magnetic field and means for neutralizing said damping means when rotational motion of said body is desired whereby said body may be caused to rotate to a desired position and then, by activating said damping means, be brought to an equilbrium condition.

12. A device for controlling the orientation of a rotatable body in a magnetic field, comprising, magnetic means carried by said body, angular control means attached to said body and said magnetic means for adjusting the position of said magnetic means relative to said body, permeable metallic telescoping rods attached to said body for generating a damping force when said rods are extended from said body to interact with said magnetic field, means for extending said telescopic rods from within said body so as to form relatively long protrusions from said body in said magnetic field whereby said body may be caused to rotate to a desired position and then be rapidly brought to an equilbrium condition by extending said rods.

13. A device for controlling the orientation of a rotatable body in a magnetic field, comprising, magnetic means carried by said body, angular control means attached to said body and said magnetic means for adjusting the position of said magnetic means relative to the direction of said magnetic field, permeable metallic rods extendibly attached to said body for generating a damping force when interacting with said magnetic field and means carried by said body for causing said metallic rods to extend from said body for generating a damping force when interacting with said magnetic field whereby said body may be caused to rotate to a desired position and then be rapidly brought to an equilibrium condition.

14. A device for controlling the orientation of a rotatable body in a magnetic field, comprising, magnetic means carried by said body, angular control means attached to said body and said magnetic means for adjusting the position of said magnetic means relative to said body, metallic rod means attached to said body, said rod means comprising a plurality of telescopic sections, means for adjusting the length of said rod means by sliding the smaller of said sections in the larger of said sections, whereby the orientation of said body may be controlled by adjusting the position of said magnetic means and a damping torque may be generated by said rods, the magnitude of which being dependent on the length of said telescopic rod means.

15. The device of claim 14 where said means for adjusting the length of said rod means comprises a flexible tape, one end of which is attached to the smallest section of said telescoping rod means the other end of which is attached to a driven shaft whereby the rotation of said shaft will retract and expel said tape and thereby cause the retraction and extension of said rod means.

16. A device for controlling the orientation of a rotatable body in a magnetic field, comprising, magnetic means carried by said body, angular control means attached to said body and said magnetic means for adjusting the position of said magnetic means relative to said body, retractable permeable metallic rods attached to said body for generating a damping force when interacting with said magnetic field and means, including electrical coils surrounding said rods when in the retracted position, for neutralizing the damping action of said rods when rotational motion is desired whereby said body may be caused to rotate to a desired position and then rapidly be brought to an equilibrium condition by de-energizing said electrical coils and extending said rods.

17. In a space vehicle with a self-contained source of power surrounded by a directional magnetic field and orbiting about a point in space, the improvement comprising, a magnetic device rotatably mounted within said vehicle, means for displacing said magnetic device from the direction of said field and then maintaining said device and said body in fixed relationship whereby said magnetic device will rotate said body in the direction of alignment with said field, permeable metallic damping rods attached to said body and interacting with said field to retard rotational motion of said body and means to neutralize said rods when rotation of said body is desired.

18. In a space vehicle with a self-contained source of power surrounded by a directional magnetic field and orbiting about a point in space, the improvement comprising, a magnetic device rotatably mounted within said vehicle, means for displacing said magnetic device from alignment with the direction of said field and then maintaining said device and said body in fixed relationship whereby said magnetic device will rotate said body in the direction of alignment with said field, permeable metallic telescoping rods attached to said body for generating a damping force when said rods are extended from said body to interact with said magnetic field, means for extending said telescopic rods from within said body so as to form relatively long thin protrusions from said body in said magnetic field whereby said body will be rapidly brought to an equilibrium condition by the damping action resulting from the extension of said rods.

References Cited by the Examiner

UNITED STATES PATENTS

| 3,017,777 | 1/62 | Haeusserman | 244—1 |
| 3,061,239 | 10/62 | Rusk | 244—1 |
| 3,116,035 | 12/63 | Cutler | 244—1 |

OTHER REFERENCES

Aviation Age R & D Technical Handbook, vol. 2, 1958–1959, pp. B-5 through B-10. 343-5 SAT.TL 501, A 83a.

FERGUS S. MIDDLETON, *Primary Examiner.*